US007261258B1

(12) United States Patent
Fox, Jr.

(10) Patent No.: US 7,261,258 B1
(45) Date of Patent: Aug. 28, 2007

(54) CRUCIFORM PARACHUTE DESIGN

(76) Inventor: Roy L Fox, Jr., Route 1 Box 32 A, Belleville, WV (US) 26133

( * ) Notice: Subject to any disclaimer, the term of this patent is extended or adjusted under 35 U.S.C. 154(b) by 172 days.

(21) Appl. No.: 11/353,356

(22) Filed: Feb. 14, 2006

Related U.S. Application Data

(60) Provisional application No. 60/719,725, filed on Sep. 23, 2005.

(51) Int. Cl.
*B64D 17/02* (2006.01)
(52) U.S. Cl. .................................... 244/145
(58) Field of Classification Search ............ 244/138 R, 244/139–150, 151 R, 151 A, 151 B, 152, 244/138 A, 32, 137.3, 902; 446/49, 53
See application file for complete search history.

(56) References Cited

U.S. PATENT DOCUMENTS

| | | | |
|---|---|---|---|
| 1,777,441 A * | 10/1930 | Malmer | 244/145 |
| 1,834,370 A | 12/1931 | Askam | |
| 2,119,183 A | 5/1938 | Sedlmayr | |
| 2,349,833 A * | 5/1944 | Robinson | 244/145 |
| 2,770,432 A | 11/1956 | Stevinson | |
| 2,997,263 A * | 8/1961 | Forichon | 244/145 |
| 3,136,508 A | 6/1964 | Sepp, Jr. | |
| 3,331,573 A | 7/1967 | Winker et al. | |
| 3,504,874 A | 4/1970 | Lemoigne | |
| 3,531,067 A | 9/1970 | Mitchell | |
| 3,559,931 A | 2/1971 | Pohl | |
| 3,602,462 A | 8/1971 | Slater et al. | |
| 3,690,603 A | 9/1972 | Lemoigne | |
| 3,741,505 A | 6/1973 | Engel | |
| 3,795,376 A * | 3/1974 | Stevenson et al. | 244/145 |
| 4,730,796 A | 3/1988 | Puskas | |
| 4,778,131 A | 10/1988 | Calianno | |
| 4,834,323 A | 5/1989 | Reuter | |
| 5,037,042 A | 8/1991 | Calianno | |
| 5,078,344 A | 1/1992 | Buckley | |

(Continued)

*Primary Examiner*—Teri Pham Luu
*Assistant Examiner*—Edward J. Mayle
(74) *Attorney, Agent, or Firm*—John J. Giblin, Jr.; Bowles Rice McDavid Graff & Love LLP

(57) ABSTRACT

An improved cruciform-type parachute is provided for aerial delivery of cargo, with a center panel shaped as a square or other regular polygon, and first lens-shaped panels conjoined to each edge of the center panel. The first lens-shaped panels are formed of two circular section sub-panels conjoined along their respective arc segments. Side panels, shaped as rectangles or other quadrilaterals, have one edge conjoined with each first lens-shaped panel at the other edge opposite from the center panel. The adjacent side edges of each pair of adjacent side panels are conjoined to either convex edge of a second lens-shaped panel. The second lens-shaped panels are defined by three edges; two of which are defined by symmetrically opposed convex arcs joined at one end, and the third edge defined by a straight line intersecting the other ends of the arcs. One end of each of a plurality of upper rigging members are disposed along an edge opposite from the first lens-shaped panel on each side panel. The other ends of the upper rigging members converge and conjoin with an upper end of a single lower rigging member. The lower end of each lower rigging member connects to the supported cargo. Additional lens-shaped panels may be disposed between lateral divisions of the side panels.

18 Claims, 9 Drawing Sheets

U.S. PATENT DOCUMENTS

| | | |
|---|---|---|
| 5,472,394 A | 12/1995 | Michaelson |
| 5,839,695 A | 11/1998 | Puskas |
| 6,328,262 B1 * | 12/2001 | Sadeck et al. .............. 244/142 |
| 6,443,396 B1 | 9/2002 | Berland |
| 6,520,453 B1 | 2/2003 | Sadeck |

* cited by examiner

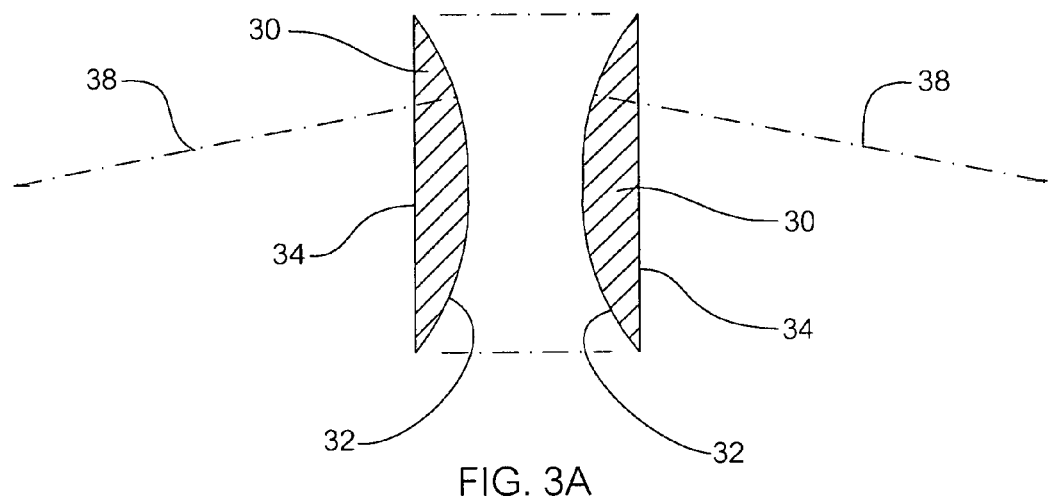
FIG. 3A
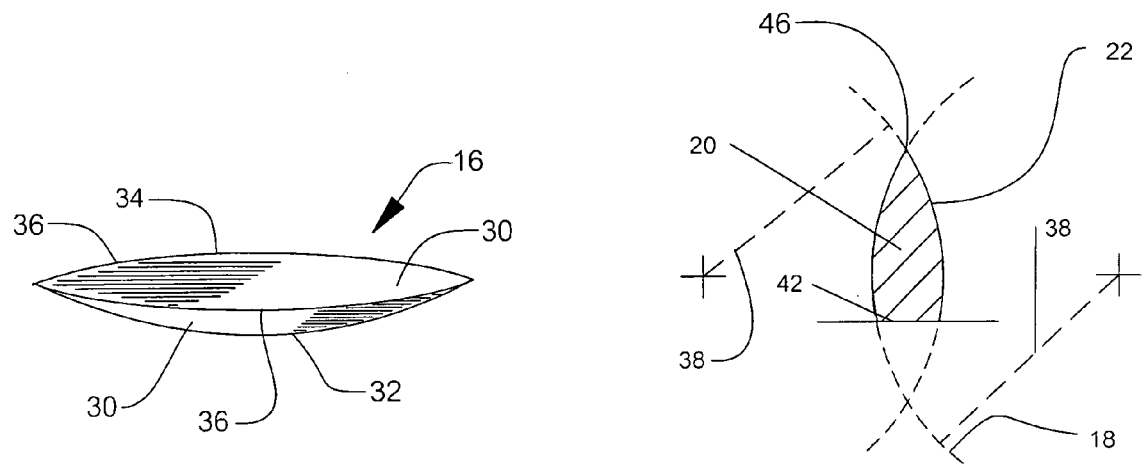
FIG. 3B
FIG. 4

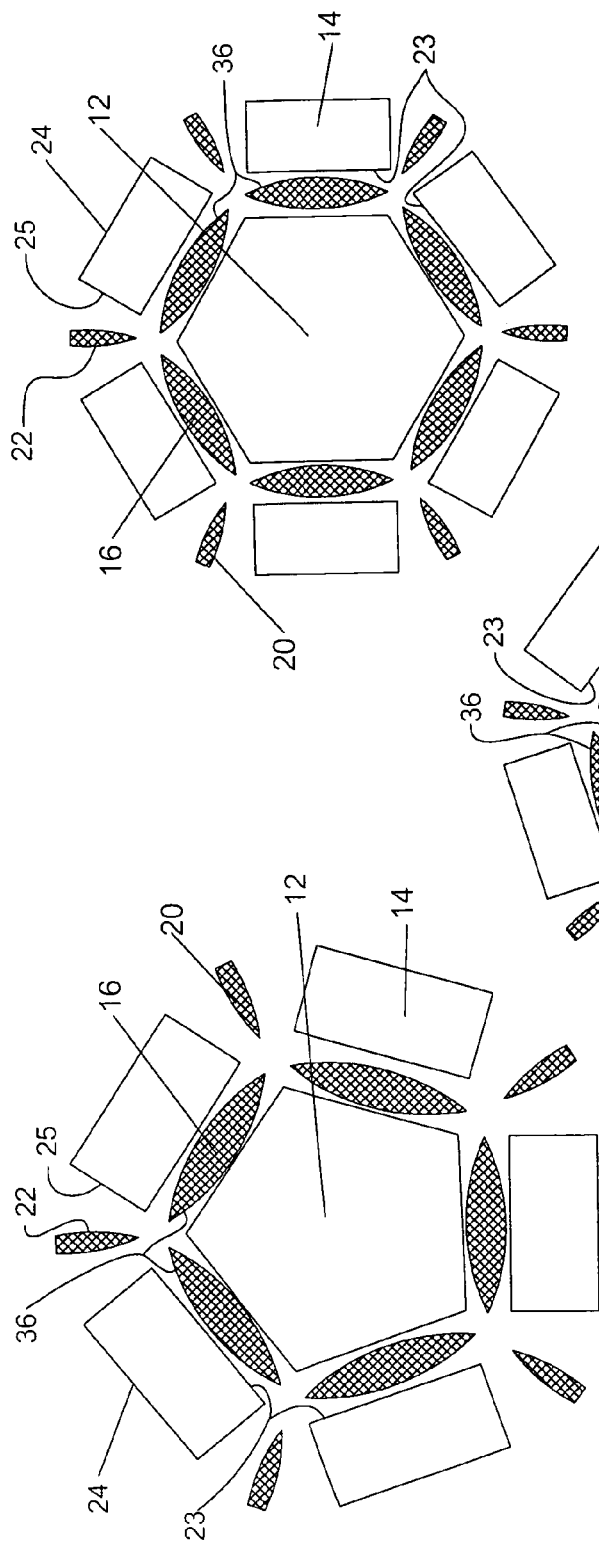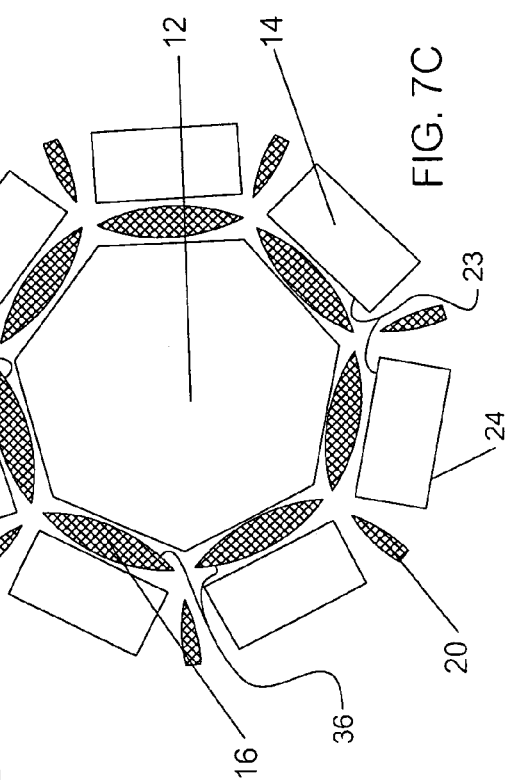

CRUCIFORM PARACHUTE DESIGN

CROSS REFERENCE TO RELATED APPLICATIONS

This application claims priority under 35 U.S.C. §119(e) from U.S. Provisional Application No. 60/719,725, filed under 35 U.S.C. 111(b) Sep. 23, 2005 entitled "Semispherical Cruciform Parachute Design".

BACKGROUND OF THE INVENTION

1. Field of the Invention

The present invention relates to parachute designs, particularly to the cruciform-type parachute design.

2. Description of the Prior Art

Parachutes are an integral component of systems used to deliver cargo or loads aerially to remote or inaccessible locations. To deliver a load aerially, the load, furnished with a parachute delivery system, is transported to the delivery site by aircraft. Upon reaching the delivery site, the load is released, ejected or dropped from the aircraft. Shortly after release, a parachute is deployed which is attached to the load by suspension lines and other rigging. The deployed parachute decelerates the descending load to a velocity at which the load may land on the ground or water without damage.

Desirable features for an aerial-delivery parachute include low manufacturing costs. Another desirable feature is a high drag coefficient, which is related to manufacturing cost, as a parachute design with a higher drag coefficient can be smaller or have less material in its construction to deliver the same load. Another desirable feature is strong ballistic characteristics, without a tendency to glide randomly, so that the load does not collide with other aerially-delivered cargoes. A further desirable feature is high stability, since a ballistic load in aerial delivery has no means of controlling its descent once the parachute has deployed.

Several parachute designs have traditionally been used for aerial delivery. One is referred to as the radial-gore circular parachute. This parachute design is the one commonly associated with paratroopers. It is constructed of panels, or gores, each cut in a generally slender, tapering, trapezoidal shape and sewn together along their elongated sides to form a circular pattern, with the narrow base of each gore at the center of the circular pattern and the longer base at the perimeter, forming the skirt of the parachute.

A radial-gore circular parachute has a high drag coefficient and is generally stable. However, it has high manufacturing costs, due to the material wasted from cutting the gores and from the large number of seams to be sewn.

Examples of variations of this radial-gore circular parachute design include Thomblad, U.S. Pat. No. 1,685,688 (1928); Henvis, U.S. Pat. No. 1,733,732 (1929); Malmer, U.S. Pat. No. 1,777,441 (1930); Sedmayr, U.S. Pat. No. 2,119,183 (1938) and Hart, U.S. Pat. No. 2,458,264 (1949).

Another parachute design used in aerial cargo delivery is the cruciform-type parachute. The cruciform-type parachute, when viewed from above or stretched out deflated, resembles a cruciform, or cross shape. In its simplest embodiment, it is formed by orthogonally overlapping two equal rectangles of material, with each rectangle having an aspect ratio of approximately 1:3, and sewing around the perimeter of the square overlapping area. This creates a design with a square center panel, which in this fabrication method would be two plies thick, with four square or rectilinear single-ply side panels conjoined on each edge of the square center panel. Suspension lines are attached to the edges of the side panels opposite from the square center panel, which conjoin at their opposite ends at the load. Using two rectangular panels with aspect ratios less than 1:3 will produce a design with a square center panel and rectangular side panels.

The cruciform-type parachute is simple and inexpensive to fabricate, involving little material waste in fabricating the two rectangular panels, and low labor costs due to the few number of seams in the design. However, the typical cruciform-type parachute design has low drag efficiency and low stability.

Typical examples of variations on the cruciform-type parachutes can be found in Mitchell, U.S. Pat. No. 3,531,067; Slater et al., U.S. Pat. No. 3,602,462; and Engel, U.S. Pat. No. 3,741,505.

As can be seen in these examples, the side panels are pulled towards a more spherical shape by the suspension lines connecting the lower edges of the side panels, often referred as the skirt, to the suspended cargo, load or parachutist. This causes the skirt to cup or curl as it is drawn inward by the suspension lines. The side edges of the side panels are unconstrained, allowing significant undesirable air leakage, as well as causing turbulence which can destabilize the descending parachute.

Several attempts have been made in the art to control the unconstrained lateral edges of the side panels of these cruciform-type parachutes. For example, in Berland, U.S. Pat. No. 6,443,396 (2002), the lateral edges of the side panels are stitched together. However, this creates a parachute with a more polyhedral rather than a spherical shape, which in turn leads to uneven levels of stress and strain throughout the parachute.

SUMMARY OF THE INVENTION

To overcome the limitations of the prior art, a modified cruciform-type is provided which better simulates a spherical shape by inserting additional lens-shaped panels.

Three-dimensional first lens-shaped panels are provided between the edges of the center panel and each of the rectilinear side panels of a cruciform-type parachute. The first lens-shaped panel shape is formed by joining two pliant sub-panels, each sub-panel equally shaped as a circle segment. The perimeter of each of the two equal circle segments is bounded by a straight line and a circular arc. The two sub-panels are joined along their respective arcuate edges, forming a three-dimensional construct similar in appearance to an elongated canoe, with the two adjacent straight edges defining the perimeter of the lens-shaped panel. One lens-shaped panel is installed between each side panel and the center panel, with one straight edge of the lens-shaped panel conjoined to the edges of the center and side panels, respectively.

The side edges of adjacent side panels are likewise joined to either convex edge of a second lens-shaped panel. The second lens-shaped panel is fabricated in the shape of a partial lens, having an area defined by two equal, symmetrically opposed arcs, and a third, straight line.

Together, the installation of the first and second lens-shaped panels permit the improved cruciform parachute to achieve a shape more spherical than a conventional cruciform-type parachute, with corresponding improvements in handling, stability and drag efficiency, with little additional fabrication expense.

One intent of the present invention is to provide a cruciform-type parachute with improved aerodynamic characteristics.

Another intent is to provide a cruciform-type parachute with improved stability.

Another intent is to provide a parachute with lower material and manufacturing costs than a radial-gore circular parachute.

These and other advantages of the invention will become apparent from the description which follows. In the description, reference is made to the accompanying drawings, which form a part hereof, and in which is shown by way of illustration specific embodiments in which the invention may be protected. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

DESCRIPTION OF THE DRAWINGS

FIG. 3A is an illustration of the circular section sub-panel used in the lens-shaped panel construction.

FIG. 3B is an isometric view of the lens-shaped panel assembled from two circular section sub-panels.

FIG. 4 is an illustration of the truncated lens-shaped panel construction.

FIG. 7A is an exploded view of an alternative embodiment of the invention, with a pentagonal center panel.

FIG. 7B is an exploded view of an alternative embodiment of the invention, with a hexagonal center panel.

FIG. 7C is an exploded view of an alternative embodiment of the invention, with a heptagonal center panel.

DETAILED DESCRIPTION OF THE PREFERRED EMBODIMENTS

The following discussion describes in detail one or more embodiments of the invention. The discussion should not be construed, however, as limiting the invention to those particular embodiments, and practitioners skilled in the art will recognize numerous other embodiments as well. The complete scope of the invention is defined in the claims appended hereto.

Figure 1A:
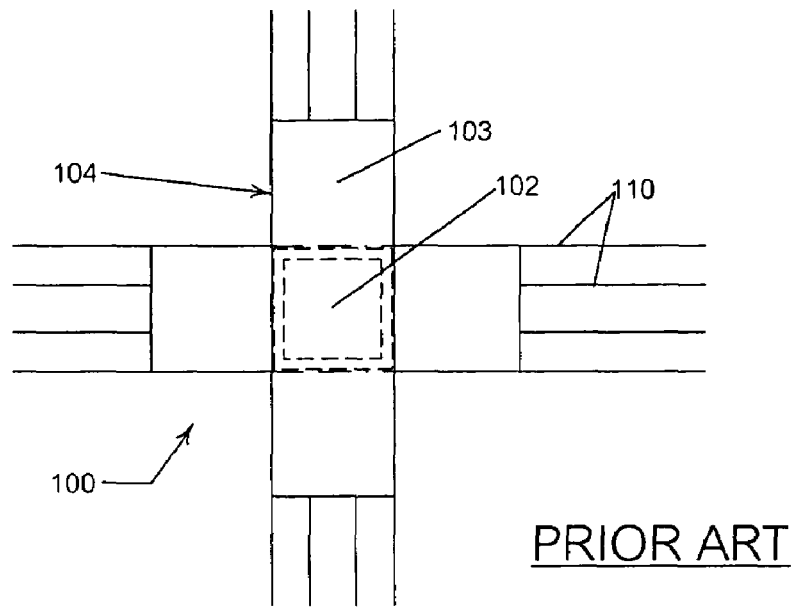
FIG. 1A is a plan view of a cruciform parachute typically found in the prior art.
Figure 1B:
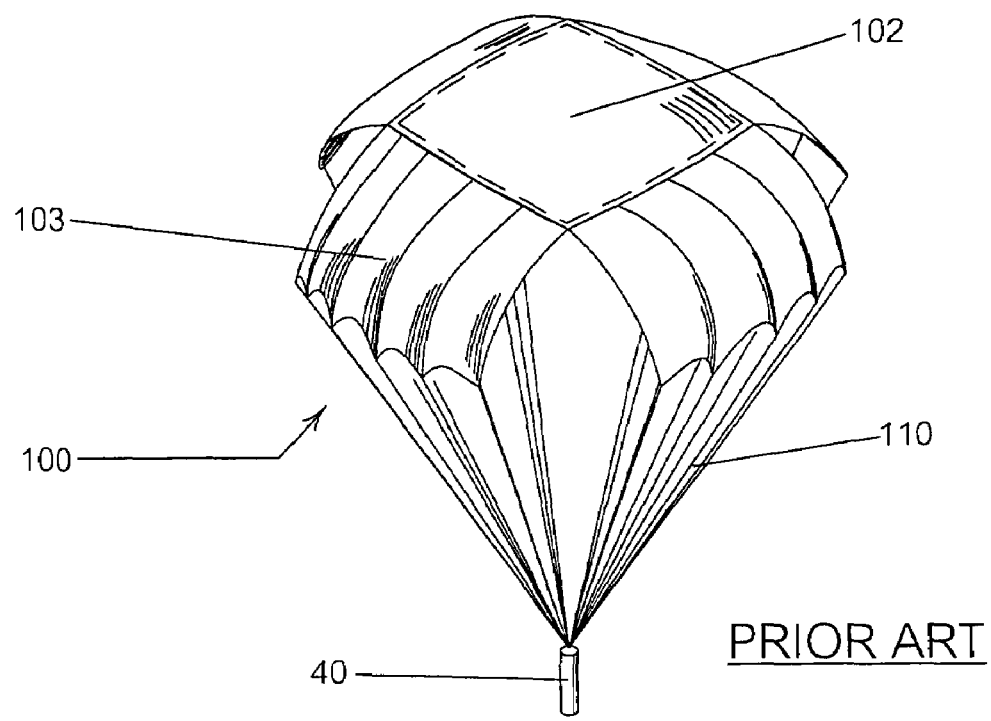
FIG. 1B is a perspective view of a cruciform parachute typically found in the prior art.

In the art of parachute delivery systems, cruciform-type parachutes 100, as shown in FIGS. 1A and 1B, are known and used. This type parachute is simple and inexpensive to fabricate. In its simplest means for construction, two rectilinear panels 104 are provided. The two rectilinear panels 104 are cut from a bolt of fabric or film suitable for use in parachutes, such as ripstop nylon or mylar. The two rectilinear panels 104 are orthogonally overlapped, thereby defining a center section overlap 102. If the two rectilinear panels 104 are equally wide, the center section overlap 102 will be square. The perimeter of the center section overlap 102 is sewn to create a cruciform-type parachute 100 with a square, two-ply center section overlap 102 and four single-ply side sections 103. If the two rectilinear panels 104 have an aspect ration of 1:3, as is typical in the art, the four side sections 103 will also be square. If the aspect ratio of the two rectilinear panels 104 is less than 1:3, then the side sections 103 will be rectangular. A plurality of suspension lines 110 are each attached by one end to the distal edges of the side sections 103. When deployed, as shown in FIG. 1B, the distal ends of the suspension lines 110 would converge under the parachute at or above a load or cargo which is being delivered aerially.

Alternatively, the typical cruciform-type parachute 100 can be manufactured by providing five panels, arranged as one square center panel 102 and each of the other four panels having one edge seamed with one of the four edges of the center panel 102. This design provides further material savings by providing a single—rather than double-ply center section.

As evident from this description, the cruciform-type parachute 100 is easy and inexpensive to fabricate. However, since the square or rectilinear panels cannot not shrink or stretch to form a spherical surface when the cruciform-type parachute 100 is deployed and inflated, stress concentrations are created in the panels of the cruciform-type parachute 100.

Figure 1C:
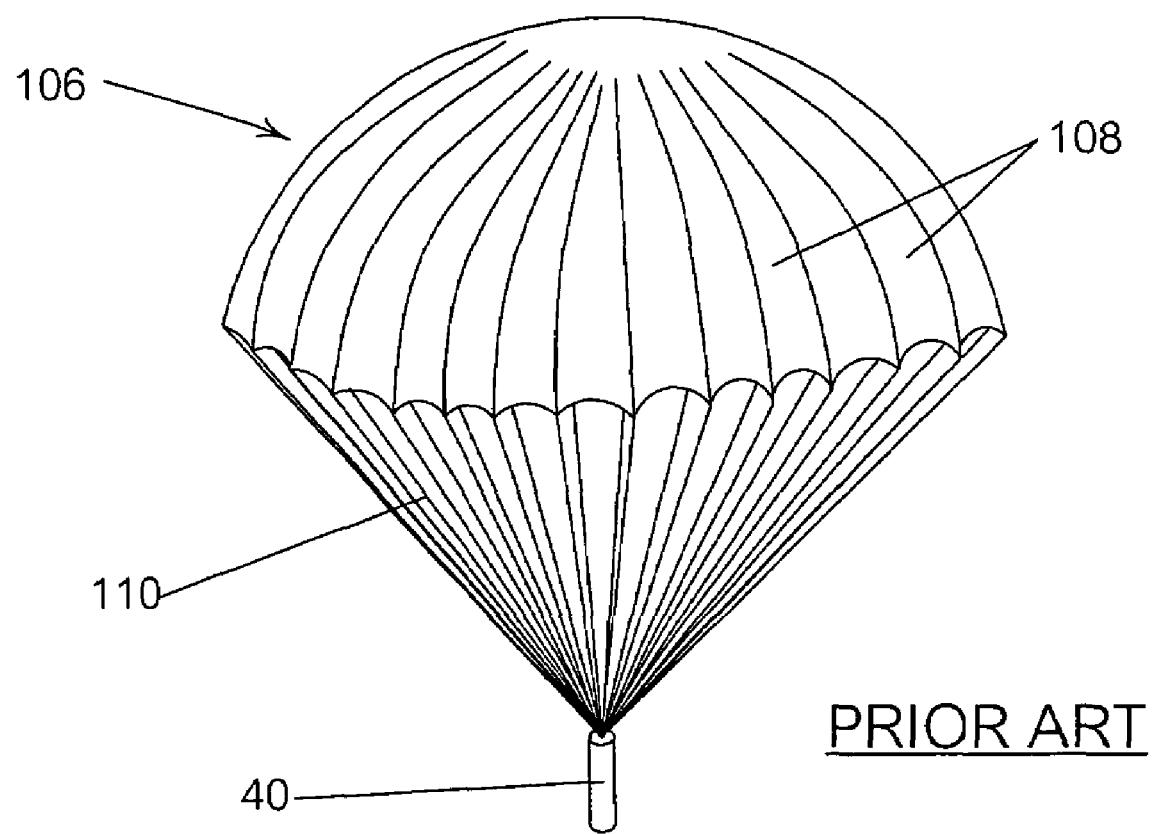
FIG. 1C is a perspective view of a radial-gore circular parachute typically found in the prior art.

In contrast, a radial-gore circular parachute 106, as shown in FIG. 1C, more closely approximates a perfect semi-sphere by radially assembling a plurality of triangular or trapezoidal gores 108. The gores 108 have two elongated sides which extend from either end of an outer edge, tapering to a point or to a smaller inner edge. The gores 108 are arranged radially into a circular pattern. Adjacent elongated sides are seamed together. The outer edges of the assembled gores 108 form the perimeter, or skirt of the parachute 106. Once the gores 108 are assembled radially, suspension lines 110 are added, extending from the skirt of the parachute at each seam of the gores 108 to the suspended load 40. The radial-gore circular parachute 106 is more stable and has better drag efficiency than the cruciform-type parachute. However, the costs of cutting and seaming the large number of gores 108 is high.

Figure 2:
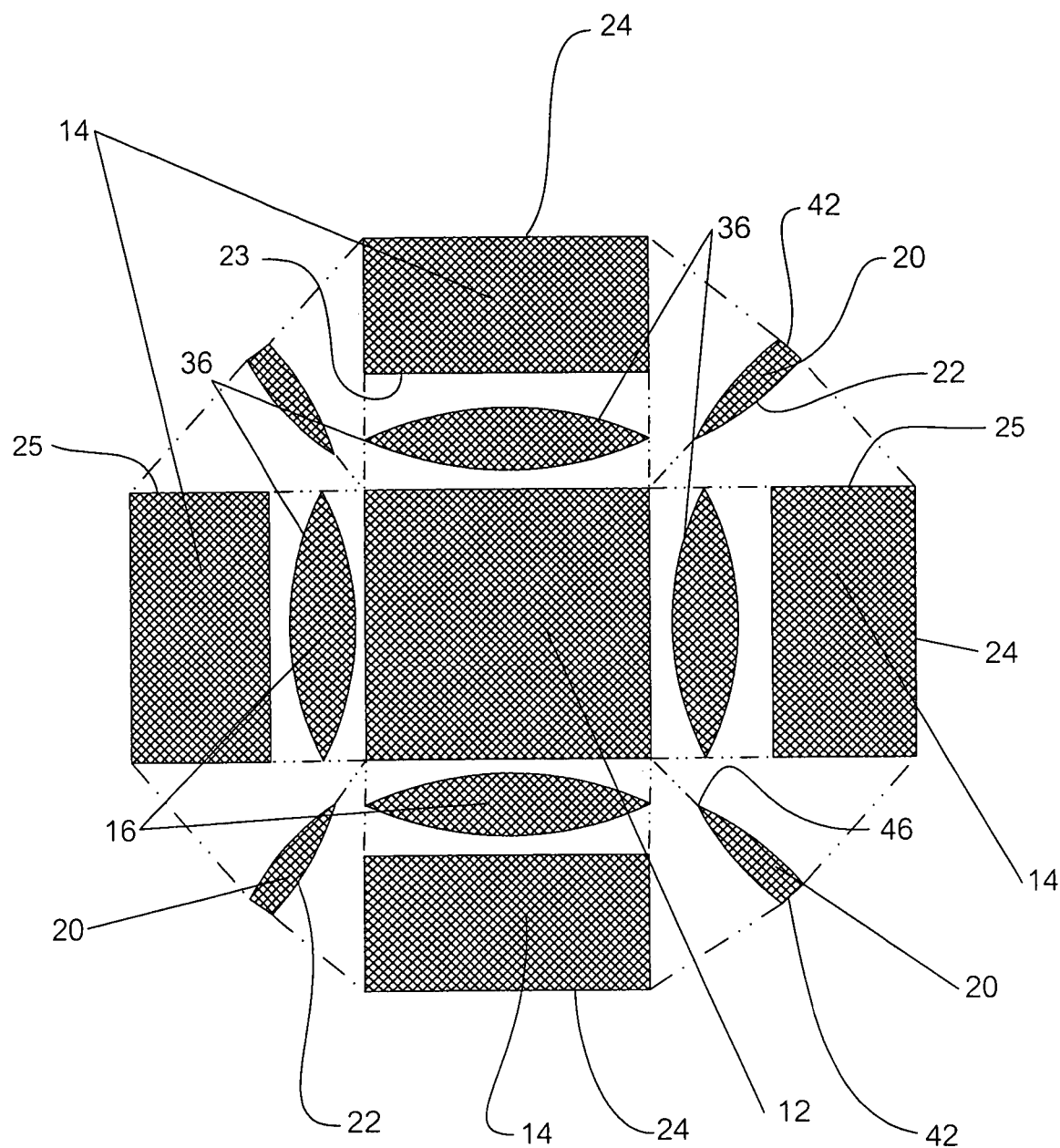
FIG. 2 is an exploded plan view of the improved cruciform-type parachute.

To provide a parachute sharing the inexpensive material and labor costs of a cruciform-type parachute, but having better stability and drag efficiency of a radial-gore circular parachute, an improved, semi-spherical cruciform-type parachute is provided. As shown in FIG. 2, an improved cruciform-type parachute is comprised of a center panel 12 and side panels 14. These panels 12, 14 are fabricated similarly to those of a typical cruciform-type parachute, generally cut from a suitable textile or film, such as nylon or mylar. The preferred embodiment comprises a square center panel 12 and four rectangular side panels 14. Other embodiments utilize center panels 12 shaped in other regular polygons, such as pentagons, and side panels 14 equal in number to the sides of the center panel 12. The side panels 14 may be square, or trapezoidal in the alternative embodiment.

While a typical cruciform parachute has one edge of a side panel 14 sewn or conjoined directly to one of the edges of the center panel 12, in the present invention a lens-shaped panel 16 is disposed between the center panel 12 and each side panel 14.

As shown in FIG. 3, each lens-shaped panel 16 is constructed of two equal sub-panels 30 from pliant fabrics or materials known in the art for manufacturing parachutes. The material is cut into the shape of two circular sections; in other words, part of a circle defined by a straight chord and an arc segment of the circumference of the circle intersected by that chord. These circular section sub-panels 30 have a first, arcuate edge 32 defined by the arc segment and a second, straight edge 34 defined by the chord. The radius of curvature 38 of the arcuate edge 32 is preferably 75% greater than the length of the straight edge 34. The length of the straight second edge 34 is equal to that of the edges of the center panel 12.

The lens-shaped panel 16 is constructed by aligning two equal circular section sub-panels 30 in parallel. The arcuate edges 32 of the two circular section sub-panels 30 are conjoined into a seam by sewing or other methods known in the art. This produces an article which, when the two straight second edges 34 are separated, produces a three-dimensional shape for the lens-shaped panel 16 resembling the hull of a canoe, as shown in FIG. 3A, and, when viewed in plan view, has a projected shape of a lens. The straight second edges 34 of the two conjoined circular sub-panels 30 form and correspond to the two edges 36 of the assembled lens-shaped panel 16. The conjoined arcuate edges 32 of the two sub-panels 30 from the "keel" of the canoe.

Returning to FIG. 2, each edge of the center panel 12 is sewn to, or otherwise conjoined with one edge 36 of a first lens-shaped panel 16. The other edge 36 of the same first lens-shaped panel 16 is sewn or otherwise conjoined with a proximal edge 23 of one of the side panels 14. When assembled as described, the side panel 14 has a proximal edge 23 conjoined to the lens-shaped panel 16, a distal edge 24 opposite from the proximal edge 23, and two opposite side edges 25 each adjacent to the proximal and distal edges. The proximal edge 23 of each side panel 14 is equal to the length of the edge of the center panel 12, as well as that of the first lens-shaped panel edge 36. Sewing or conjoining the two edges 36 of the lens-shaped panel 16 to the center panel 12 and side panel 14 causes the latter two panels to curl under, into a three-dimensional shape more resembling a section of a sphere than the polyhedral shape of a typical cruciform parachute of the prior art.

In the preferred embodiment, the side panel 14 is rectangular, with a 1:2 aspect ratio. However, other quadrilateral shapes may be used, such as squares or trapezoids. In an alternative embodiment (not shown), the side panels 14 have the shape of inverted trapezoids, with the longer base edge proximal to the first lens-shaped panel 16.

To further approximate a semi-spherical shape in the inflated improved cruciform-type parachute, the adjacent side edges 25 on each pair of adjacent side panels 14 are sewn or otherwise conjoined to either convex edge 22 of a second lens-shaped panel 20. As shown in FIG. 4, a second lens-shaped panel 20 is constructed from a flat panel of fabric, in a shape defined by two symmetrically opposed arcuate, convex edges 22. One end of each convex edge 22 is coincident at a vertex 46. The other end of each convex edge 22 is coincident with either end of a straight first base edge 42 orthogonal to the major axis bisecting the angle formed at the vertex 46 by the two convex edges 22. The length of the convex edges 22 of the second lens-shaped panels 20 equals the length of the side edges 22 of the side panels 14. As shown in FIG. 2 the second lens-shaped panel 20 is sewn or otherwise conjoined by its convex edges 22 to the side edges of adjacent side panels 14, such that the vertex 46 of the second lens-shaped panel 20 is coincident with the corners formed by the proximal edge 23 and side edges 25 of each of the two adjacent side panels 14. The base edge 42 of the second lens-shaped panel 20 aligns with the distal edges 24 of the adjacent side panels 14.

Figure 5:
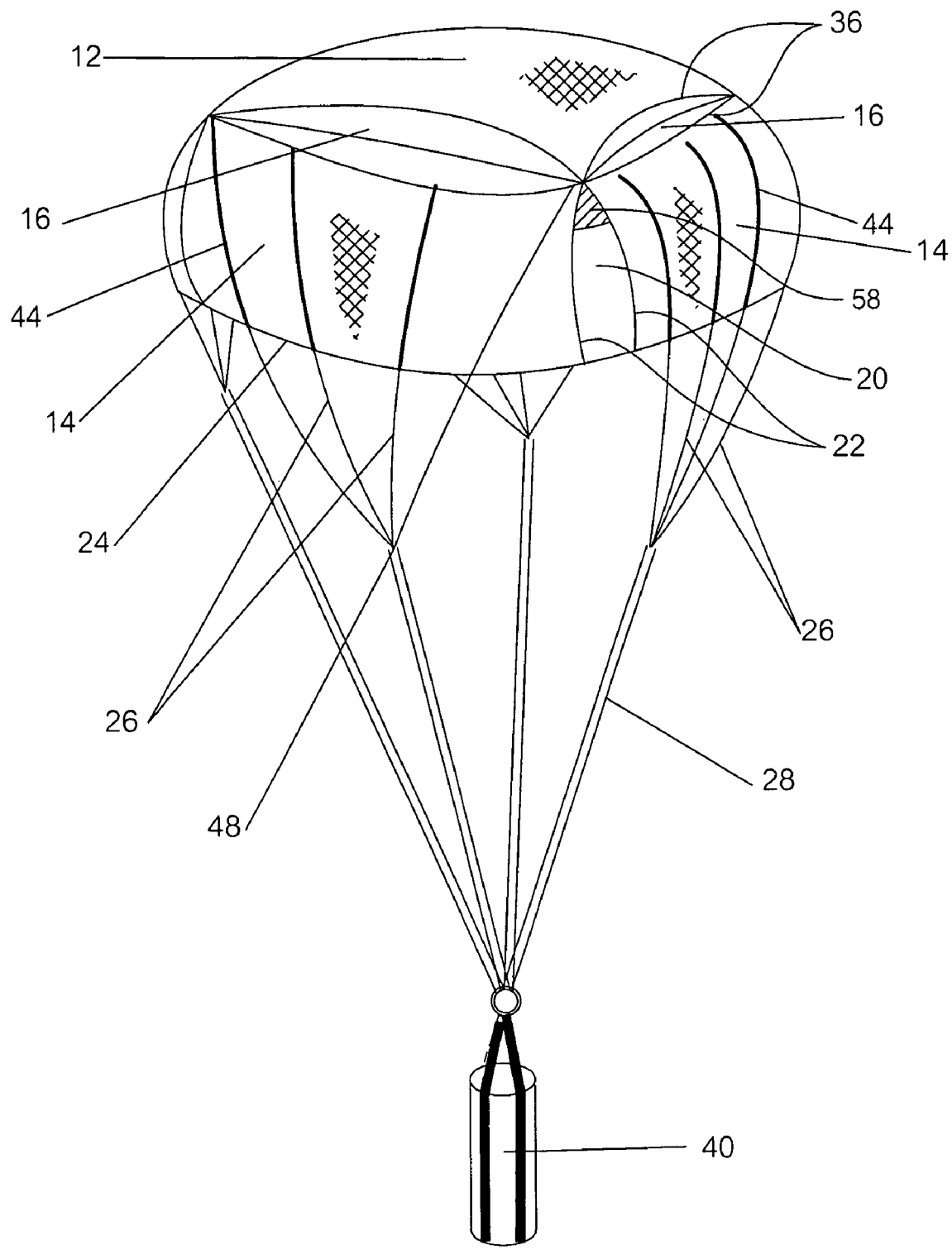
FIG. 5 is a perspective view of the assembled improved cruciform-type parachute.

When the improved cruciform-type parachute is placed in use, as shown in FIG. 5, a load 40 is suspended by a suspension means from the inflated parachute. One possible embodiment (not shown) utilizes a typical rigging arrangement, with suspension lines emanating from short risers attached to the harness of the suspended load 40 to the outer or distal edge 24 of the four side panels 14. The preferred embodiment, however, as shown in FIG. 5, involves a plurality of upper rigging members 26 having one end attached at equal intervals to the distal edges 24 of each side panel 14. The set of upper rigging members 26 from each side panel 14 converge and are assembled at their lower end sections at a convergence point 48. At that convergence point 48, each set of assembled upper rigging members 26 conjoin with an upper end section a single lower rigging member 28. The other, lower end section of the lower rigging member 28 couples with the harness or attachment means of the load 40. The lower end sections of the upper rigging members 26 and the upper end section of the lower rigging members 28 may be assembled and conjoined by splicing or attaching to, for example a common ring or riser link.

In the preferred embodiment, the lower rigging members 28 are longer than the upper rigging members 26, and, preferably, twice as long. The lower two-thirds of the overall rigging has fewer rigging lines than a typical rigging common in the art, having only four lines, or otherwise only a number equal to the number of side panels 14. This reduced number of suspension or rigging lines in the lower section of the rigging reduces the risk of line entanglement during descent, which risks improper or incomplete inflation of the parachute.

Figure 6:
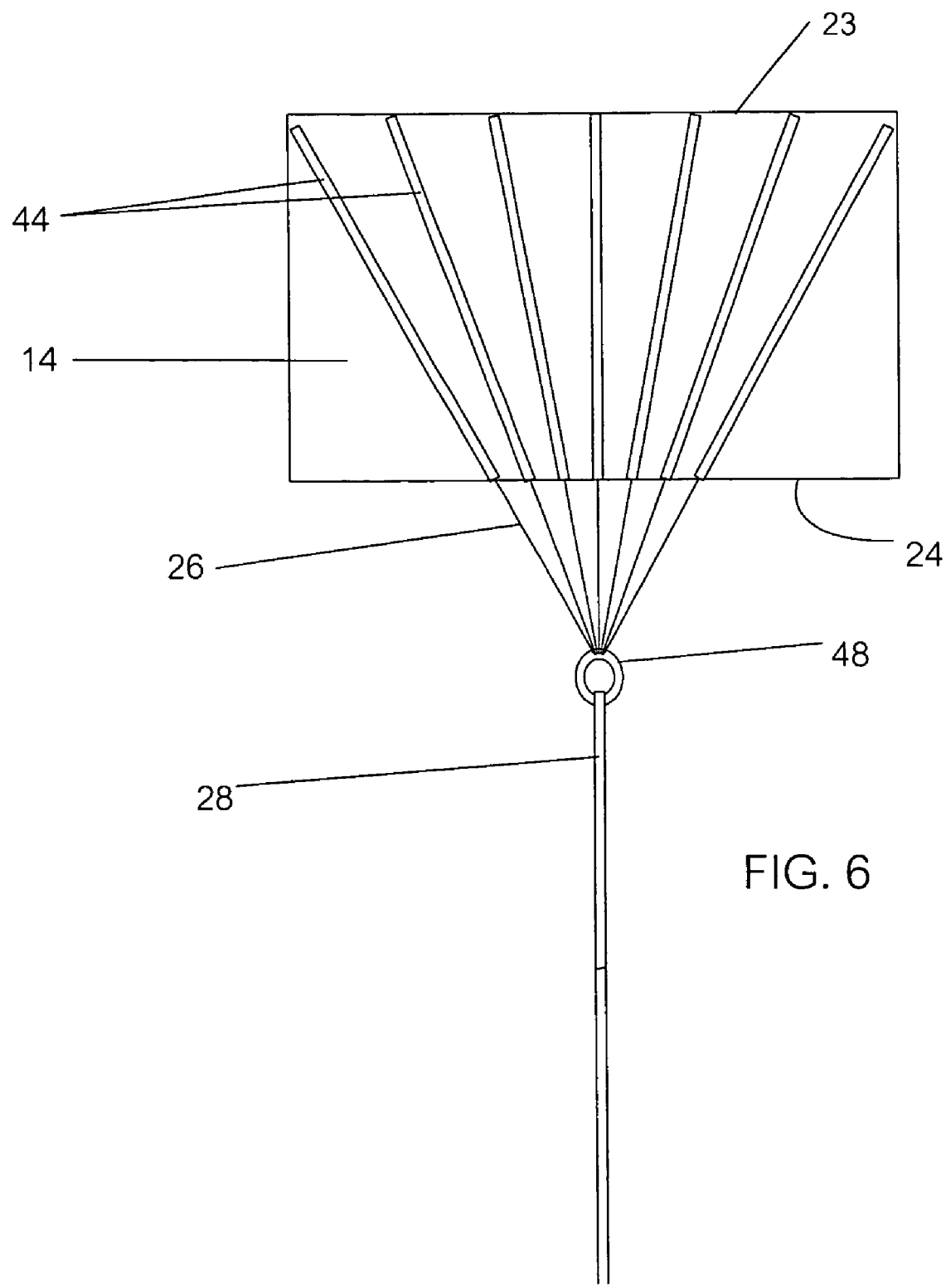
FIG. 6 is an illustration of the arrangement of upper and lower rigging members.

Turning to FIG. 6, the material forming the side panels 14 may be strengthened for accommodating the stresses transmitted by the upper rigging members 26 by providing a plurality of linear reinforcements, such as reinforcing strips 44 in or on each side panel 14. The number of reinforcing strips 44 equals the number of upper rigging members 26 attached to the distal edge 24 of side panel 14. The upper rigging members 26, together with the reinforcing strips 44, are arranged collinearly in a radial pattern, with one end of a reinforcing strip 44 coincident with the point of attachment of the upper end section of an upper rigging member 26 to the distal edge 24 of the side panel 14 and traversing the side panel 14 along a line collinear with the upper rigging member 26 towards the proximal edge 23 of the side panel 14. The reinforcing strip 44 may be formed of a specified length of webbing sewn to the side panel 14, or by folding over and sewing a seam in the side panel 14. The upper rigging members 26 extend between the distal edge 24 of the side panel 14 to the convergence point 48. At this convergence point 48, the lower ends of the upper rigging members 26 conjoin with the upper end of the lower rigging member 28, such as by a riser link. From that point, the lower rigging member 28 extends to engage with the load (not shown).

In other embodiments of the invention, the center panel 12 is replaced with one of various regular polygonal shapes, such as, for example, pentagons, hexagons or heptagons, as shown in FIGS. 7A, 7B and 7C, respectively. Other polygonal shapes, such as octagons, or triangles, may be used. In these embodiments, first lens-shaped panels 16 of the same design as above are again attached by one edge 36 to each of the edges of the polygonal center panel 12. For example, a parachute with a hexagonal center panel 12 shown in FIG. 7B would have one of six first lens-shaped panels 16 attached to each of the six edges of the hexagonal center panel 12. A side panel 14 would then be sewn or otherwise conjoined to the other edge 36 of the first lens-shaped panel 16 opposite the center panel edge. As before, the side panels 14 are typically rectangular, but may be of other quadrilateral shapes, such as squares or trapezoids, but generally with parallel opposite edges proximal 23 and distal 24 to the edge formed with the first lens-shaped panel 16. The side edges of each side panel 14 are likewise sewn or otherwise conjoined to either convex edge of a second lens-shaped panel 20. The distal edges 24 of the side panels 14 and the first base edges 42 of the second lens-shaped panels 20 form the parachute skirt. The rigging members (not shown) are attached from the distal edges 24 of the side panels 14 as described previously.

Typically, the first lens-shaped panels 16 and the second lens-shaped panels 20 are made of the same material or fabric typically used to make the center and side panels 12, 14. These materials include nylon, mylar and other fabrics made of natural or synthetic fibers. The first lens-shaped panels 16 may be made of fabrics or materials having permeable interstices, such as with a more open weave or even an open netting. The permeable interstices increase stability at the expense of aerodynamic drag efficiency. These panels may also have one or more vents or other discrete openings to improve aerodynamic characteristics.

Stability may be further improved by providing vents in the assembled parachute. Vents provided at the top section of the second lens shaped panels between the side panels have been shown as particularly effective. As shown in FIG. 5, a small, triangular-shaped section may be removed from the top end section of the second lens-shaped panel 20 to provide a vent 58. Vents of other configurations and geometries may be provided in the second lens-shaped panels joining the lateral edges of the side panels.

When the improved cruciform-type parachute is deployed and inflated, as shown in FIG. 5, the first lens-shaped panels 16 and the second lens-shaped panels 20 induce the center and side panels 12, 14 to curl or cup, and form a more spherical shape to the parachute than is typical for a cruciform-type parachute of the prior art. This more spherical shape improves the aerodynamic characteristics and equalizes the stresses on the cruciform parachute.

A cruciform-type parachute may be further modified into a more spherical shape after inflation by further insertions of additional lens-shaped panels 20, 52 into divisions 50 of the rectilinear side panels 14, as shown in FIGS. 8A–8D. One or more such lens-shaped panels 20, 52 may be inserted between two or more lateral divisions 50 of the side panels 14. The lateral divisions 50 of the side panel 14 are created by one or more equally spaced slices through the side panel 14 orthogonally to the proximal and distal edges 23, 24 of the side panel 14.

Figure 8A:
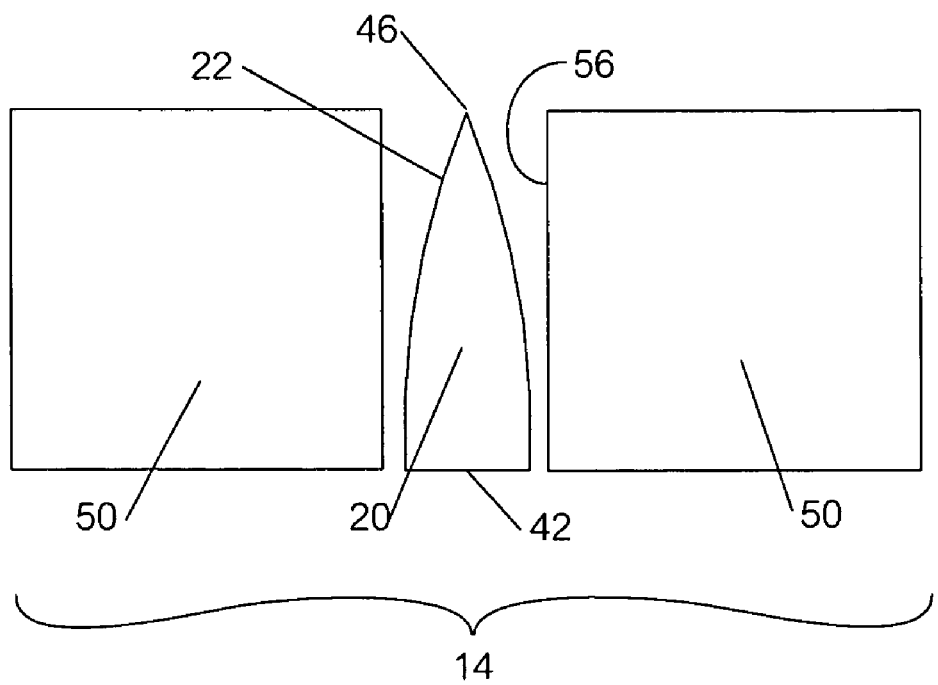
FIG. 8A is an exploded elevational view of a side panel modified with the insertion of a second lens-shaped panel.

In FIG. 8A, one second lens-shaped panel 20 is inserted between two lateral divisions 50 of the side panel 14. The two convex edges 22 of the second lens-shaped panel 20 are conjoined with the interior lateral edge 56 of either side panel division 50, by sewing or other means commonly known in the art. By joining the straight interior lateral edges 56 of the side panel division 50 with the convex edges 22 of the second lens-shaped panel 20 causes the modified side panel 14 to cup or curl, with a more convex shape more approximating that the surface of a sphere. Similarly, in FIG. 8C two second lens-shaped panels 20 are inserted between three lateral divisions 50 of the side panel 14, which again modifies the shape of the assembled side panel 14 by introducing a convex cup or curl into its surface. Further second lens-shaped panels 20 may be inserted between further divisions 50 of the side panel 14. The widths of the divisions 50 and the second lens-shaped panels 20 may vary to achieve a desired inflated shape.

Figure 8B:
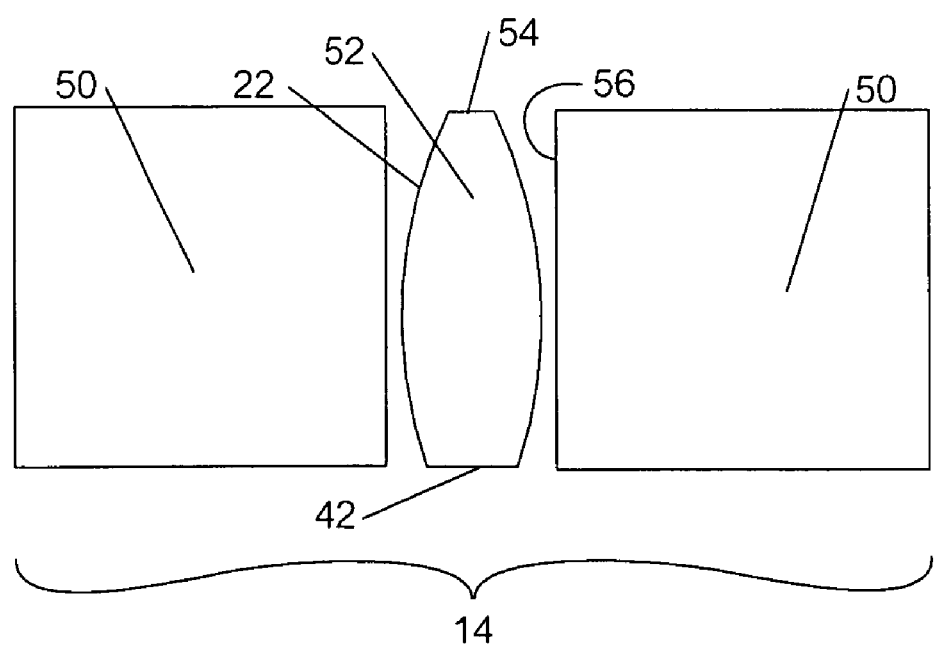
FIG. 8B is an exploded elevational view of a side panel modified with the insertion of a third lens-shaped panel.
Figure 8C:
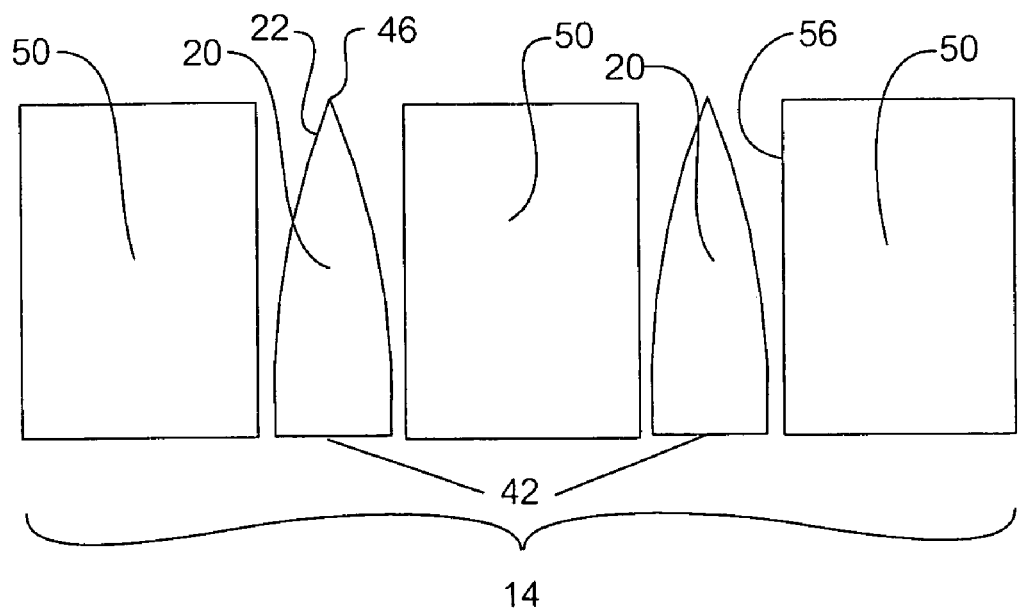
FIG. 8C is an exploded elevational view of a side panel modified with the insertion of a plurality of second lens-shaped panels.
Figure 8D:
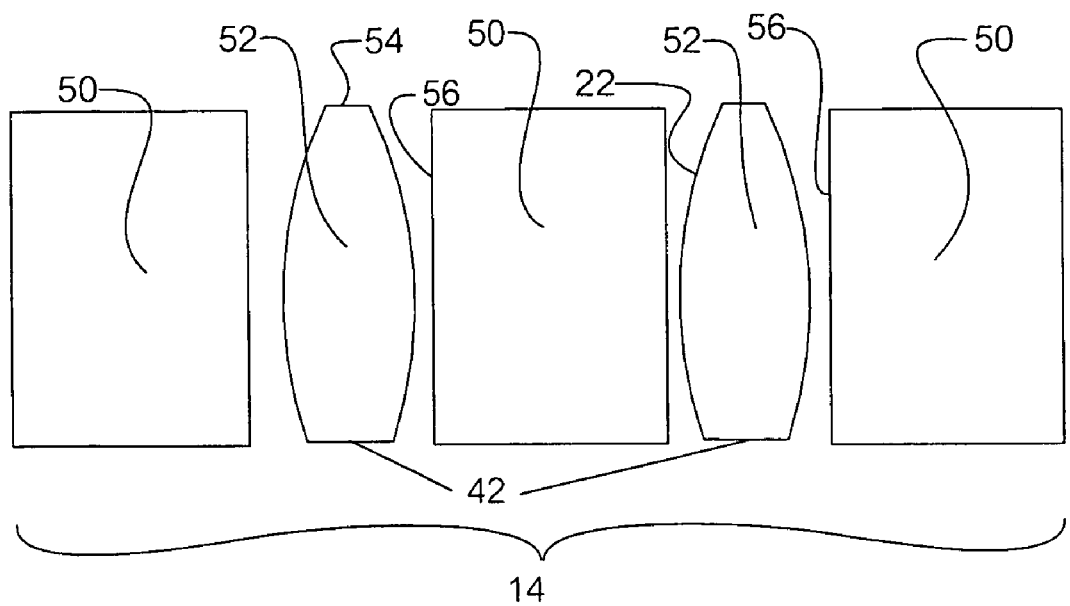
FIG. 8D is an exploded elevational view of a side panel modified with the insertion of a plurality of third lens-shaped panels.

FIGS. 8B and 8D illustrate the insertion of one or more third lens-shaped panels 52 between an appropriate number of lateral divisions 50 of the side panel 14. The third lens-shaped panel 52 is constructed similarly to the second lens-shaped panel 20, except that the first end of each convex edge 22 are coincident, rather than with each other at the apex 46, instead with either end of a second base edge 54. The second base edge 54 is parallel to the first base edge 42, and generally, but not necessarily, shorter than the first based edge 42.

While various embodiments of the invention have been described above, it should be understood that they have been presented by way of example, and not limitation. It will be apparent to persons skilled in the relevant art that various changes in form and detail may be made therein without departing from the spirit, and scope and application of the invention. This is especially true in light of technology and terms within the relevant art that may be later developed. Thus, the present invention should not be limited by any of the above-described exemplary embodiments, but should only be defined in accordance with the appended claims and their equivalents.

I claim:

1. A semi-spherical cruciform-type parachute, comprising:
   a) a polygonal center panel having straight edges;
   b) a plurality of first lens-shaped panels, each lens-shaped panel comprising a first and a second edge, wherein the first edge of each lens-shaped panel conjoins one of the straight edges of the center panel, wherein the number of lens-shaped panels equals the number of center panel straight edges;
   c) a plurality of quadrilateral side panels comprising proximal, distal and two side edges, wherein the proximal edge of each side panel conjoins with the second edge of one of the lens-shaped panels;
   d) a plurality of second lens-shaped panels, each second lens-shaped panel having two convex and one straight edges, wherein each second lens-shaped panel conjoins by its two convex edges with adjacent side edges of adjacent side panels; and,
   e) a plurality of rigging members having upper end sections, wherein the upper end sections of the rigging members are disposed on the side panels.

2. The semi-spherical cruciform-type parachute of claim 1, wherein the quadrilateral side panels are of a shape selected from the group consisting of a square, a rectangle and a trapezoid.

3. The semi-spherical cruciform-type parachute of claim 1, wherein the shape of the polygonal center panel is selected from a group consisting of a triangle, a square, a pentagon, a hexagon, a heptagon and an octagon.

4. The semi-spherical cruciform-type parachute of claim 1, wherein the arc defining the two convex edges of the second lens-shaped panels is circular.

5. The semi-spherical cruciform-type parachute of claim 1, wherein the arc defining the two convex edges of the second lens-shaped panels is elliptical.

6. The semi-spherical cruciform-type parachute of claim 1, further comprising a plurality of linear reinforcements disposed on each of the side panels.

7. The semi-spherical cruciform type parachute of claim 6, wherein the linear reinforcements on each side panel are aligned collinear with the rigging members disposed on the side panel distal edge.

8. The semi-spherical cruciform parachute of claim 1, further comprising one or more vents defined within each second lens-shaped panel.

9. A semi-spherical cruciform-type parachute, comprising:
   a) a square center panel having four straight edges;
   b) four equal first lens-shaped panels, each first lens-shaped panel comprising a first and a second edge, wherein the first edge of each first lens-shaped panel conjoins one of the straight edges of the center panel, wherein the number of first lens-shaped panels equals the number of center panel straight edges;
   c) four equal quadrilateral side panels comprising straight proximal, distal and two side edges, wherein the proximal edge of each side panel conjoins with the second edge of one of the first lens-shaped panels;
   d) four second lens-shaped panels, each second lens-shaped panel having two convex and one straight edges, wherein each second lens-shaped panel conjoins by its convex edges with adjacent side edges of adjacent side panels;
   e) a plurality of rigging members having upper and lower ends, wherein the upper ends of an equal number of rigging members are disposed on the distal edge of each side panel;
wherein the quadrilateral side panels further comprise a plurality of linear reinforcements disposed on each side panel collinear with the rigging members disposed on the distal edge of the side panel.

10. The semi-spherical cruciform-type parachute of claim 9, wherein the shape of the quadrilateral side panels is selected from the group consisting of a square, a rectangle and a trapezoid.

11. The semi-spherical cruciform-type parachute of claim 9, wherein the arcs defining the two convex edges of the second lens-shaped panels are circular.

12. The semi-spherical cruciform-type parachute of claim 9, wherein the arcs defining the two convex edges of the second lens-shaped panels are elliptical.

13. The semi-spherical cruciform-type parachutes of claim 1 or 9, wherein the rigging members on each side panel comprise a plurality of upper rigging members having upper and lower ends, wherein the upper ends of the upper rigging members are disposed on the distal edge of the side panel, and further comprising a single lower rigging member, wherein the lower ends of the upper rigging members and the upper end of the lower rigging member are coupled.

14. The semi-spherical cruciform-type parachute of claim 13, wherein the length of the lower rigging member is at least twice the length of the upper rigging members.

15. The semi-spherical cruciform-type parachute of claim 1 or claim 9, wherein the first lens-shaped panels comprise two sub-panels, each sub-panel defined by a circular section having an arcuate edge and a straight edge, wherein the two circular section sub-panels are conjoined along the respective arcuate edges.

16. The semi-spherical cruciform-type parachute of claim 1 or 9, wherein the first lens-shaped panels comprise permeable interstices.

17. The semi-spherical cruciform-type parachute of claim 1 or 9, wherein the side panels further comprise one or more second lens-shaped panels disposed between lateral divisions of the side panel.

18. The semi-spherical cruciform-type parachute of claim 1 or 9, wherein the side panels further comprise one or more third lens-shaped panels disposed between lateral divisions of the side panel, wherein each third lens-shaped panel has a shape defined by two symmetric convex edges, each convex edge having a first end coincident with either end of a first straight edge, and each having a second end coincident with either end of a second straight edge, wherein the first and second straight edges are parallel.

* * * * *